Oct. 19, 1965    J. B. O'MALEY    3,212,338
DIGITAL MANOMETER
Filed March 29, 1962    2 Sheets-Sheet 1

INVENTOR.
JAMES B. O'MALEY
BY
Leonard H. King
ATTORNEY.

Oct. 19, 1965          J. B. O'MALEY          3,212,338
DIGITAL MANOMETER
Filed March 29, 1962          2 Sheets-Sheet 2
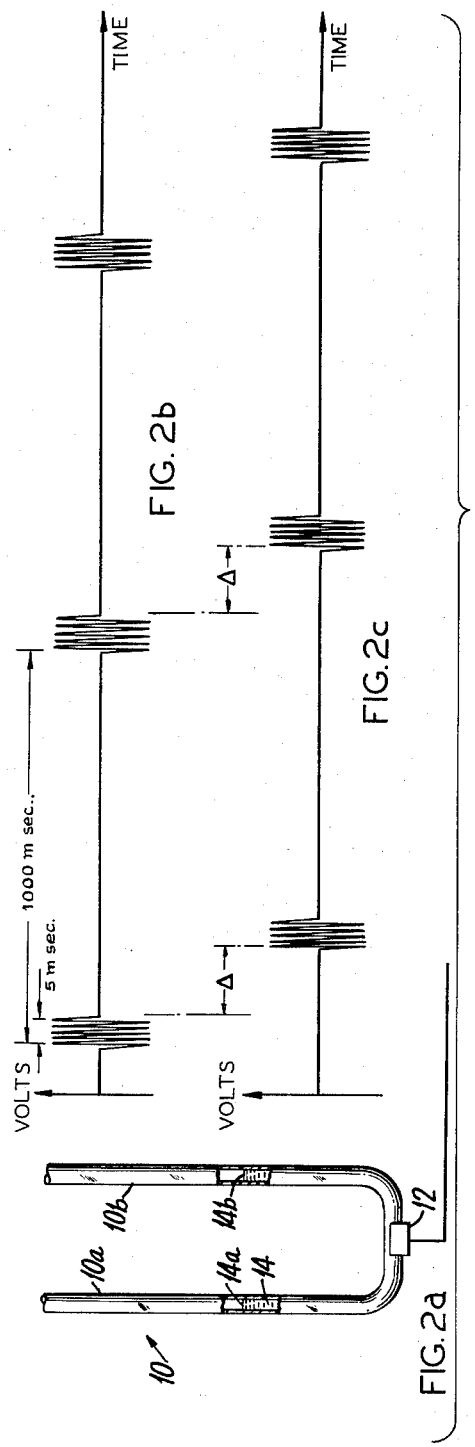
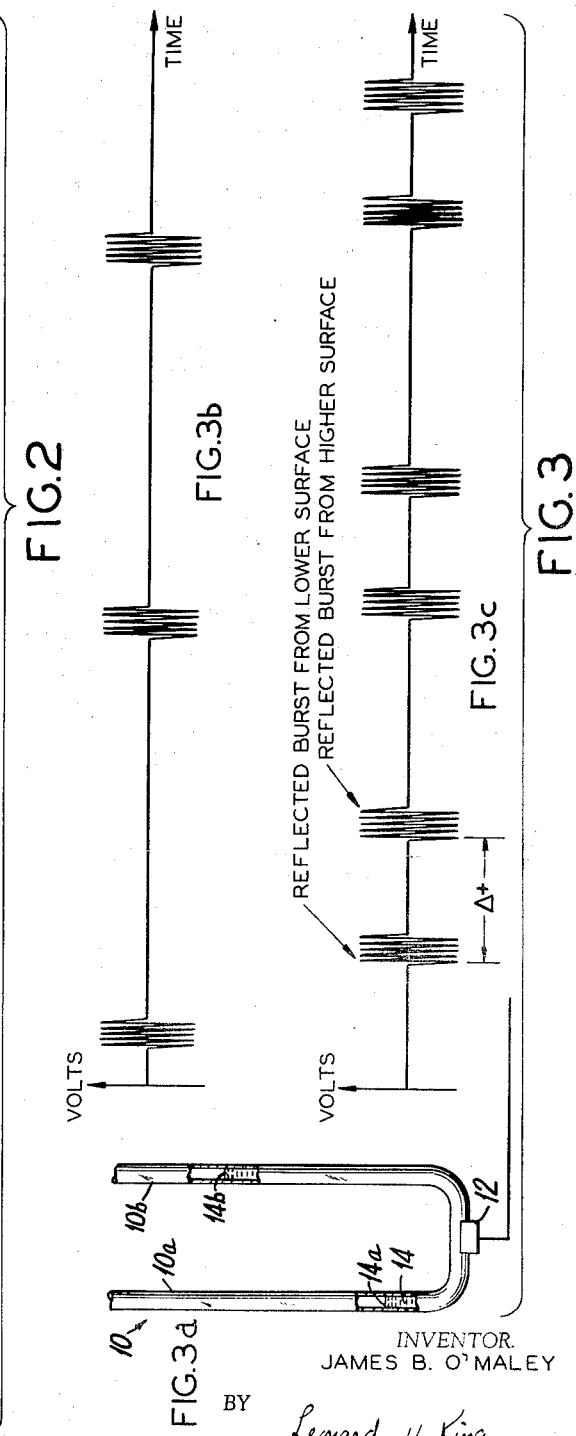
INVENTOR.
JAMES B. O'MALEY
BY Leonard H. King
ATTORNEY.

United States Patent Office 3,212,338
Patented Oct. 19, 1965

3,212,338
DIGITAL MANOMETER
James B. O'Maley, 25–32 NE. 22nd Terrace,
Fort Lauderdale, Fla.
Filed Mar. 29, 1962, Ser. No. 183,678
6 Claims. (Cl. 73—401)

This invention relates to manometer devices and in particular, to such a device provided with automatic readout means.

The well known U-tube manometer employs a U-shaped tube filled with a liquid, customarily mercury. The relative heights of the liquid columns have in the past been manually measured by visually comparing them with a scale. The possibility of error through several sources arises; for example, (1) human error, (2) accuracy limitations inherent when employing engraved mechanical scales as a reference, and (3) effects of fluid contamination. With respect to the latter fluid-contamination factor, it has been found, for example, that impurities released by manometer fluids, such as mercury, and deposited on the walls of glass tubing, produce significant errors.

It is an object of the invention to provide an improved manometer overcoming the above-enumerated deficiencies of devices according to the prior art.

Another object of the invention is to provide a manometer having a simple direct readout displaying a figure corresponding to the difference in the heights of the respective liquid columns of the U-tube, and preferably constituting a digital system.

It is also an object of this invention to provide a manometer system wherein an electronic instrument, in addition to indicating the magnitude of pressure differentials, indicates which of two pressures is the greater, as by a mathematical sign.

It is a further object of this invention to provide a manometer wherein the relative liquid columnar height is not determined by optical means but rather by more accurate electronic means.

Still another object of the invention is to provide a manometer capable of operating accurately despite the hitherto error-producing effects of impurities present in the manometer fluid and deposited on the walls of the glass tubing.

Briefly stated, this invention comprises a conventional U-tube manometer having incorporated a sound transducer at the base of the "U." Associated with the sound transducer for applying pulses thereto, there is provided a pulse train or burst generator, a digital chronometer and a digital display unit. As a pulse train from the burst generator is converted to sonic energy by the transducer in the base of the manometer, the sound travels to the surface of the fluid in each side of the manometer where it is reflected back towards the source. In the following description, the pulse train envelope is generally regarded as the "pulse." Sound arriving back at the transducer is detected and gives rise to electrical pulse trains or bursts, which are then directed to the digital chronometer. Although a digital readout technique is described here, the inventor contemplates alternative methods of readout as, for example, wherein the relative liquid height appears on a conventional ammeter type instrument. These readout techniques are well known and are commonly employed in marine ultrasonic depth indicators. If the liquid surfaces are displaced, as by a pressure difference, then a difference in path length exists from the transducer to each liquid surface. This difference in path length produces a time separation in the returning bursts received at the transducer. This time separation is then accurately measured by the digital chronometer.

Still other objects and advantages of the invention will, in part, be pointed out with particularity and will, in part, become obvious as the following description proceeds, taken in conjunction with the drawings.

In the drawings:

FIG. 1 is a diagrammatic showing of the digital manometer of this invention.

FIG. 2 includes FIGS. 2a, 2b, and 2c. FIG. 2a is a diagrammatic showing of the manometer with the liquid columns at equal heights. FIGS. 2b and 2c show graphically the relationship between pulse bursts and reflected signals for the condition shown in FIG. 2a.

FIG. 3 includes FIGS. 3a, 3b, and 3c. FIG. 3a shows diagrammatically the manometer condition in which the liquid columns are of unequal height; and FIGS. 3b and 3c show respectively the pulse bursts and reflected pulses for the condition shown in FIG. 3a.

Figure 1:
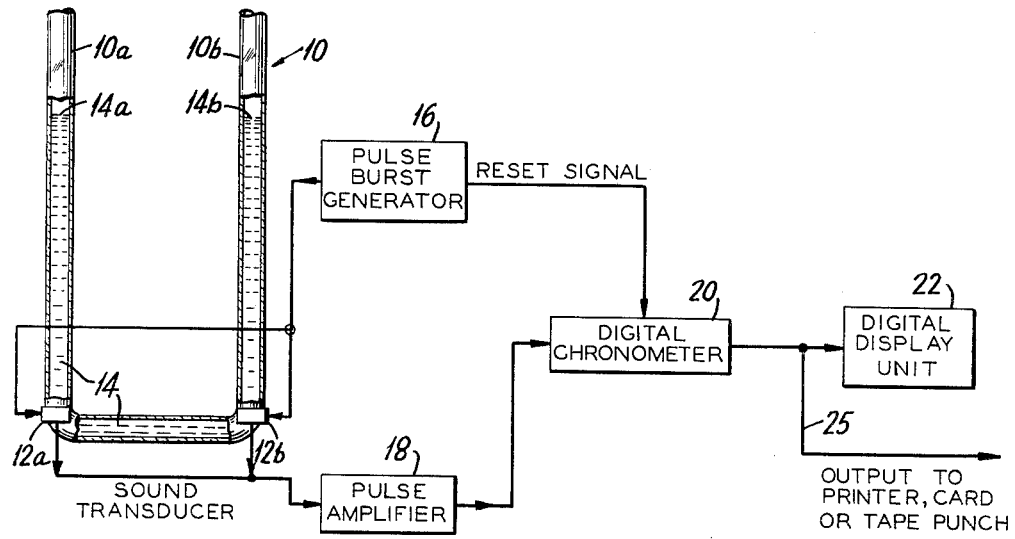

In FIG. 1, a U-tube 10 has incorporated in its base, in each of the upstanding legs 10a, 10b, of the U-tube a piezo-electric crystal designated 12a and 12b, respectively. Liquid mercury, designated 14, and forming two communicating liquid columns within the U-tube, is employed as the displaceable liquid, although the invention contemplates other suitable liquids for this purpose. The mercury 14 terminates at respective surfaces 14a, 14b. An ultrasonic-frequency pulse generator 16, having an output connecting to the crystals 12a, 12b, provides a chain of bursts. Successive bursts in the chain are spaced about 1000 microseconds apart and last a duration of 5 microseconds each, while oscillating at a frequency of 1 megacycle. Each burst or pulse is transmitted by the transducer crystals 12a, 12b to the mercury 14 within the U-tube. The liquid 14 simultaneously propagates this signal, that is to say, the pulses or bursts, through the respective manometer arms 10a, 10b, until they are reflected back by the respective liquid surfaces 14a, 14b and again propagated towards the crystals 12a, 12b. A pulse amplifier 18, connecting the crystals 12a, 12b, to a conventional digital chronometer 20 which will indicate the interval between the bursts, receives the reflected bursts or pulses forming the signal and amplifies them. The pulse amplifier 18 may be a conventional amplifier designed to handle frequencies of 1 megacycle. The chronometer 20 receives each pulse from the amplifier 18. The chronometer 20 also connects to the pulse burst generator 16 to receive a reset pulse each time the generator transmits a pulse to the crystals 12a, 12b. The reset pulse clears the chronometer and sets it to start measuring time upon receipt of the next pulse, namely, the first pulse received by the crystals 12a, 12b, after passing through the U-tube. The second pulse stops the time measurement. The chronometer then transmits to a digital display unit 22, a signal corresponding to the time difference between the pulse echoes, that is to say, the time difference between the reflected pulse from one leg 10a or 10b and the other leg 10b or 10a. A parallel output 25 may be used to energize the conventional printer card or tape punch.

FIGS. 2 and 3 illustrate the effects of various levels of liquid in U-tube 10 upon the pulse time position.

FIG. 2a illustrates a U-tube wherein the liquid 14 in each leg reaches the same level. FIG. 2b illustrates a series of pulse bursts from the generator 16. In place of two crystals, 12a, 12b, a single precisely centered crystal 12 may be employed. When the pulses from the transducer crystal 12 are propagated through two columns of liquid 14, the return pulses reflected from their respective surfaces 14a, 14b, reach the crystal 12 simultaneously and are sensed as a single pulse. This is illustrated in FIG. 2c where, upon a time axis corresponding to that of FIG. 2b, the single echo-pulse transmitted from the crystal 12, through the amplifier 18 to the chronometer 20, is seen. Under such circumstances, the digital display unit 22 reads 0.

When the respective levels of liquid in legs 10a and 10b are different, in response to condition to be measured, the signal output through amplifier 18, in response to signals (as in FIG. 3b) transmitted from the generator, is shown in FIG. 3c. Here again, in FIGS. 3b and 3c, the horizontal time axes correspond. The first burst in FIG. 3c constitutes the pulse reflected from surface 14a, namely, the lower surface closer to crystal 12. The second burst constitutes the pulse reflected from surface 14b, namely, the higher surface. The time interval $\Delta+$ in the two pulses corresponds to the difference in level between the surfaces 14a and 14b.

A suitable pulse burst circuit for use in the disclosed embodiment of the invention constitutes that, for example, shown by an article in the publication "Electronics," Engineering Edition, June 20, 1958, on pp. 59 et. seq., by J. D. Ross and R. W. Leep. The frequency of oscillation during each pulse is preferably in the ultrasonic range because ultrasonic energy when transmitted through the transducer 12 will emulsify and establish in suspension any particles constituting impurities in the fluid 14. The ultrasonic energy will therefore cleanse the interior surfaces of U-tube 10 at the mercury glass interface. The cleansing action has been experimentally observed and is particularly favorable because unsuspended impurities and deposits have hitherto been a cause of considerable inaccuracies. The sludge at the top of a mercury column has been observed to vanish after short exposure to ultrasonic energy.

In summary, the embodiment, according to FIG. 1, operates as follows: The U-tube 10 is subjected to the conditions, e.g., pressure differential, which shift the liquid 10 so as to measure the desired condition. The pulse burst generator is turned on so as to apply a continuous chain of pulses to the transducer crystal 12 for transmitting the pulses through the liquid 14 in the respective legs 10a, 10b, until the pulses are reflected by the surfaces 14a, 14b and returned to crystal 12. The sonic energy suspends any particles within or on the surface of the liquid and cleanses the U-tube of particles in the interface between the U-tube and the liquid. The reflected pulses are amplified in the amplifier 18 and passed to a chronometer 20. For each pulse applied by the generator, two pulses return to the crystal 12, one from each respective surface 14a, 14b. The first of the returning and amplified pulses, i.e., the one from the lower or closer surface, initiates timing within the digital chronometer. The second pulse, echoed by the higher surface 14a or 14b, that is, the surface more distant from crystal 12a or 12b, halts the timing. The chronometer 20 is cleared for actuation at each first pulse by a reset pulse issued from the generator with each energizing pulse to the crystal 12. The digital display unit shows the time elapsed between the first and second pulses as a measure of the difference in heights between the surfaces 14a and 14b. The invention contemplates the digital display unit converting the elapsed time between pulses to units of height differential in the U-tube as well as in units of the ultimate magnitude to be measured, e.g., pressure.

Digital chronometers are well known. They are sold commercially, for example, by Computer Measurements Corp. of 5528 Vineland Ave., North Hollywood, Calif. Their advertising brochure CMC–15, 10M–11/56, for Model 226A, Universal Counter-Timer, is hereby incorporated into this specification as an example of such a digital chronometer. Also incorporated by reference into this specification is an article by Oska Maffiat in "The Journal of the Acoustical Society of America," vol. 26, No. 2, pp. 241–243, dated March 1954. This article confirms the ability of ultrasonic waves to emulsify seemingly immiscible liquids, for example, water and mercury.

The invention also contemplates, although only a digital display is described, readout wherein the relative surface heights of surfaces 14a, 14b, appear on a conventional ammeter or D'Arsonval type of instrument. Such readout techniques are well known, and are used, for example, in marine ultrasonic depth indicators.

The use of this apparatus offers the following advantages over conventional instruments.

The invention permits direct measurement of the relative heights of two fluid surfaces as opposed to the conventional monometer, wherein the relative height is determined as an arithmetic operation subtracting two absolute height measures. By directly obtaining the relative height, a number of possible error sources are eliminated. Moreover, standard electronic techniques for measuring time intervals to extremely high accuracies afford a potential accuracy far superior to that obtainable with engraved mechanical scales and will avoid human errors in reading.

Impurities released by manometer fluids and deposited on the walls of the glass tubing produce significant errors. In the digital manometer, the ultrasonic energy tends to keep these impurities in suspension and thus these errors are avoided.

The invention contemplates the sound transducer 12 being offset from the center position between the legs or arms 10a and 10b, even to the point of being located within one of the arms. In such an arrangement, liquid columns 10a, 10b, of equal height, produce a time spacing at transducer 12 between the return signals from the two columns. The digital display unit 22 is set to read zero for such time spacing; or the signal time spacing between respective return signals, corresponding to liquid levels 14a, 14b, of equal height, is subtracted from the output of the digital chronometer. Such an arrangement affords a reading corresponding in magnitude to the differential in heights between columns 10a and 10b and also providing a positive or negative sign depending upon which column is higher.

Figure 4:
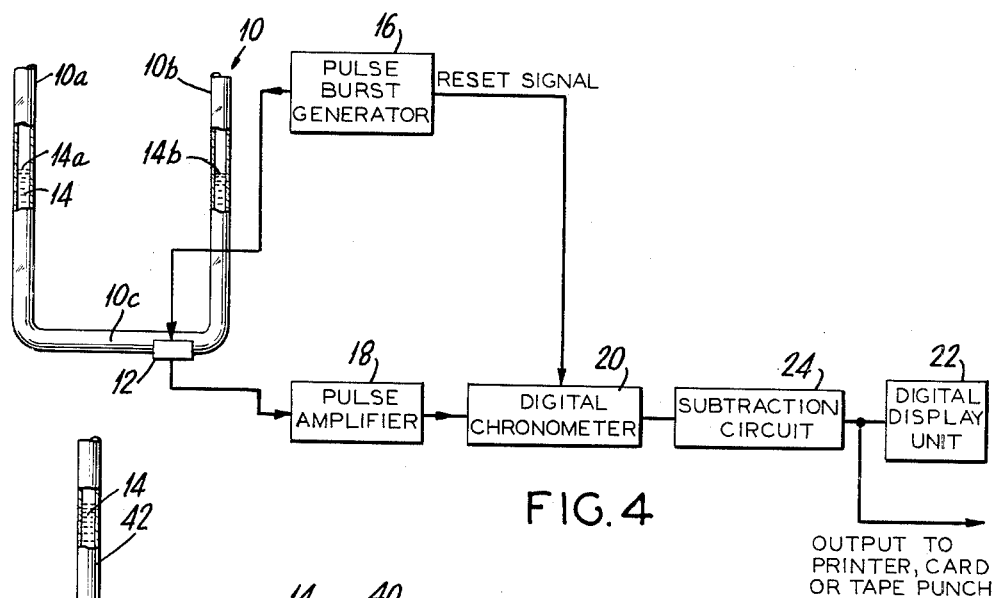
FIG. 4 shows schematically an alternative embodiment of a manometer of this invention.

Such an arrangement is shown by the embodiment of the invention in FIG. 4. It differs from FIG. 1 in the aspects discussed. Here the U-tube 10 includes between the arms 10a, 10b, an elongated base-tube 10c having a length equal at least to the height of one liquid column when the columns are equal. The signal transducer 12 is located at the extreme right of base tube and applies to the liquid a set of pulse bursts from generator 16. Each pulse burst passes through each liquid column and returns to the transducer 12 as two echoes. Amplifier 18 transmit the echo signals at transducer 12 to the digital chronometer 20 which is cleared by a reset signal for every pulse issued by generator 16. A subtraction circuit 24 subtracts from the reading of chronometer 20 a value equal to the offset of transducer 12; that is to say, the value of the time spacing between the return or echo pulses from the liquid level 14a and 14b. A display unit 22 provides a positive or negative result depending upon which liquid level, 14a or 14b, is higher.

If the level 14a and 14b are equal, the time difference $\Delta$ of return signals may, for example, be X. The subtraction circuit 24 then subtracts X from the value X to provide a zero reading. Where level 14a is higher than level 14b, due to a pressure differential, for example, the time spacing between return pulses from levels 14a, 14b, is $y$, where $y > x$. The digital chronometer then has an output equal to $y$ and the output of subtraction circuit is $y-x$, a positive number. If level 14b is higher than the level 14a, the time spacing between return pulses from levels 14a, 14b, is $z$ where $z < x$. The digital chronometer then has an output equal to z and the output of the subtraction circuit is z−x, a negative number. The display unit 22, is of course, capable of displaying both positive and negative numbers. The positive number indicates that level 14a is higher and the negative output indicates that level 14b is higher.

In another embodiment of the invention, subtraction circuit 24 is omitted and the value x is subtracted from the output merely by setting the display unit to zero for a value of x input thereto.

Figure 5:
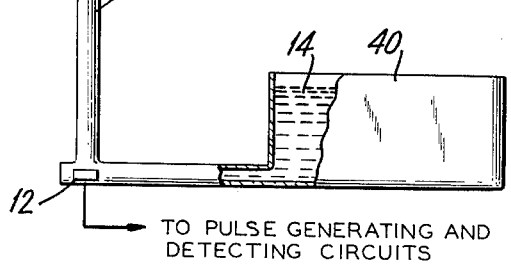
FIG. 5 is an elevational view showing the invention as embodied in a cistern type manometer.

If a cistern type manometer, as shown in FIG. 5, is employed, wherein one tube is replaced by a sufficiently large reservoir 40 that a variation in height of the liquid 14 in tube 42 will not appreciably affect the height of the liquid in the reservoir 40, then it will be appreciated that only the height of the variable liquid column, that in tube 42, need be determined by the means of this invention.

It will be obvious to those skilled in the art that the disclosed embodiments may be altered without departing from the spirit of the invention as outlined in the following claims.

What is claimed is:

1. In a manometer system including a U-tube having a liquid in both columns thereof, a pulse source having output pulses consisting of supersonic oscillations, a timing device connected to said pulse source to be reset thereby, the combination therewith of a transducer at the center of said U-tube connected to said pulse source for transmitting pulses from said source to liquid in both columns of said U-tube and for receiving pulses reflected by respective surfaces of the liquid in said U-tube, said timing device being connected to said transducer to measure the time difference between the reflected pulses in the two respective columns of liquid in said U-tube, whereby the time measured is a measure of the difference in height between the columns of liquid in said U-tube.

2. In a manometer system including a vessel carrying two communicating liquid columns forming separated liquid levels, a pulse source, pulse sensing means and a pulse readout device connected to said pulse sensing means, the combination therewith of a transducer mounted on said vessel at a location offset from the center between the liquid columns of said vessel and contacting the liquid, said pulse source and said pulse sensing means being connected to said transducer.

3. In a manometer system including a vessel defined by a U-tube having two upstanding columnar arms and having two liquid columns forming separated liquid levels connected by an elongated columnar base, a pulse source, pulse sensing means and a pulse readout device connected to the pulse sensing means, the combination therewith of a transducer mounted on said vessel at a location offset from the center between the liquid columns of said vessel and contacting the liquid, said pulse source and said pulse sensing means being connected to said transducer.

4. In a manometer system including a vessel defined by a U-tube having two upstanding columnar arms and having two liquid columns forming separated liquid levels connected by an elongated columnar base longer than either of said liquid columns when said columns are equal, a pulse source, pulse sensing means and a pulse readout device connected to the pulse sensing means, the combination therewith of a transducer mounted on said vessel at a location offset from the center between the liquid columns of said vessel and contacting the liquid, said pulse source and said pulse sensing means being connected to said transducer.

5. In a manometer system including a vessel defined by a U-tube having two upstanding columnar arms and having two liquid columns forming separated liquid levels connected by an elongated columnar base, a pulse source, pulse sensing means and a pulse readout device connected to the pulse sensing means, said pulse readout device being capable of displaying positive and negative values and including means to set the output to zero for a finite input thereto corresponding to liquid columns of equal height, the combination therewith of a transducer mounted on said vessel at a location offset from the center between the liquid columns of said vessel and contacting the liquid, said pulse source and said pulse sensing means being connected to said transducer.

6. In a manometer system including a vessel defined by a U-tube having two upstanding columnar arms and having two liquid columns forming separated liquid levels connected by an elongated columnar base, a pulse source, pulse sensing means and a pulse readout device connected to the pulse sensing means, said pulse sensing means including a subtraction circuit set to subtract a value whereby said pulse readout device will read zero when the liquid columns are of equal height, said pulse readout device being capable of reading positive and negative values, the combination therewith of a transducer mounted on said vessel at a location offset from the center between the liquid columns of said vessel and contacting the liquid, said pulse source and said pulse sensing means being connected to said transducer.

References Cited by the Examiner

UNITED STATES PATENTS

| 2,775,748 | 12/56 | Rod et al. | 73—290 X |
|---|---|---|---|
| 2,835,264 | 5/58 | Woodley | 73—401 X |
| 3,008,332 | 11/61 | Charbonnier et al. | 73—290 X |
| 3,080,752 | 3/63 | Rich | 73—290 |
| 3,100,885 | 8/63 | Welkowitz et al. | 73—290 X |
| 3,115,615 | 12/63 | Saper | 73—290 X |

FOREIGN PATENTS

| 844,878 | 8/60 | Great Britain. |
|---|---|---|

MALCOLM A. MORRISON, *Primary Examiner.*